United States Patent Office 3,286,737
Patented Nov. 22, 1966

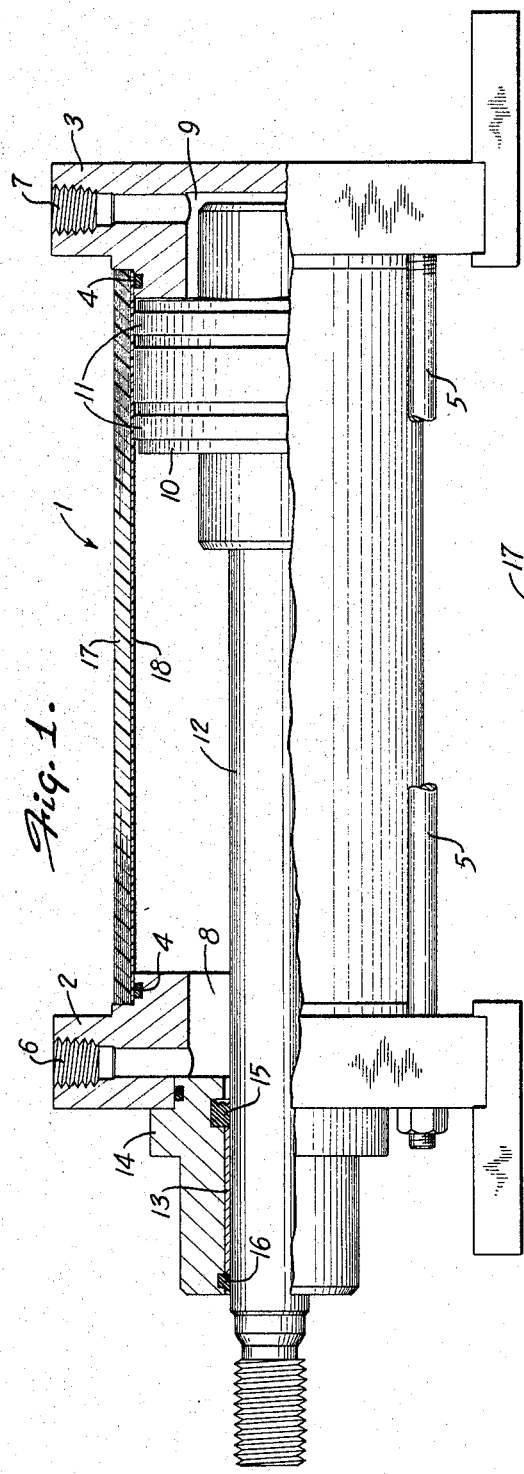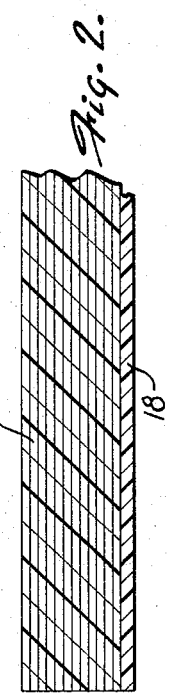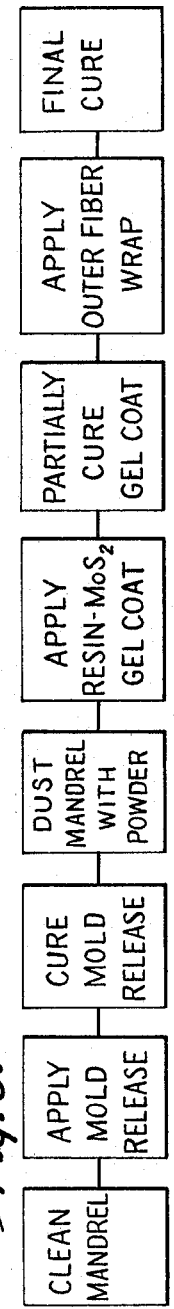

3,286,737
WEAR-RESISTANT ARTICLE AND METHOD OF MAKING THE SAME
Mark E. Kelly, Jr., Milwaukee, Wis., assignor to Dowsmith Inc., Milwaukee, Wis., a corporation of Delaware
Filed Aug. 1, 1963, Ser. No. 299,248
6 Claims. (Cl. 138—144)

This invention relates to a wear-resistant article and more particularly to a cylinder assembly having a cylinder barrel formed of fiber reinforced resin and lined with a resin coating containing particles of a lubricating material.

Cylinder barrels for use in gas and liquid cylinders are generally made of metal, such as steel or brass. It has been proposed in the past to fabricate a cylinder barrel from fiber reinforced, thermosetting resin by winding or molding the resin coated fibers around a generally cylindrical mandrel. Cylinder barrels formed from fiber reinforced resin have not proven entirely satisfactory in that the inner layer of the cylinder barrel is fiber-rich and the fibrous material on the inner surface which is generally glass fibers, may be exposed with the result that the gasketing material of the piston can be scratched or honed by the exposed fibers.

The present invention is directed to a wear-resistant article having a self-lubricating surface and is particularly adapted to a cylinder barrel to be used in an air cylinder assembly or the like. According to the invention, the cylinder barrel is formed with an outer laminated wrap or shell formed of fiber reinforced thermosetting resin. The fibrous reinforcement is in the form of a helically wound continuous filament or strand, and the outer laminate serves to provide the required physical properties for the cylinder barrel. The inner surface laminate is coated or lined with a layer of a thermosetting resin containing finely divided particles of a lubricating material such as molybdenum disulfide or graphite. The liner is bonded to the laminate to provide an integral cylinder barrel.

In preparing the article, a conventional mold release composition is initially applied to the outer surface of a mandrel and after drying, a layer of finely divided powder of graphite or molybdenum disulfide is applied over the mold release composition. A thick gel coat of the thermosetting resin containing dispersed particles of graphite or molybdenum disulfide is then applied as a continuous coating over the layer of powder to form the inner layer.

The resin is then partially polymerized to a solid, load-bearing state and a web or strand of reinforcing material coated with an uncured thermosetting resin is then wound over the partially polymerized inner layer and subsequently both layers are completely polymerized to provide an integral structure.

The layer of graphite or molybdenum disulfide powder serves as a wetting agent and has an affinity for both the mold release composition and the resin gel coat and assures that the gel coat will uniformly wet the mandrel.

The cylinder barrel made in accordance with the invention has a substantially lesser weight than a cylinder barrel of comparable size formed of metal, such as steel or brass. In addition, the article is corrosion resistant which makes the article particularly adaptable for use as a wear-resistant element in process equipment that handles corrosive materials such as in the food and chemical industry.

As the particles of the lubricating materials are dispersed or uniformly distributed throughout the inner resin layer, the cylinder barrel or other article has self-lubricating properties which will extend throughout the life of the article. The cylinder barrel requires no liquid lubricant, and thus the material moving through the cylinder will not be contaminated or adulterated by an auxiliary lubricant. This makes the cylinder barrel particularly useful in the food and chemical industries. In addition, the cylinder barrel is substantially more dent resistant than metal cylinder barrels and this minimizes any loss of tolerance on the inner diameter which may occur due to accidents during handling.

As the cylinder barrel is formed around a cylindrical mandrel, which is subsequently stripped from the completed cylinder barrel, the internal diameter of the barrel is accurately made to tolerance and no machining of the bore is required, as in the case of metal barrels.

The cylinder barrel of the invention being fabricated from non-metallic materials is non-sparking and non-magnetic which makes the barrel particularly adaptable for use with hazardous fluids.

Other objects and advantages will appear in the course of the following description.

The drawings illustrate the best mode contemplated of carrying out the invention.

In the drawings:
FIG. 1 is a longitudinal section of a cylinder assembly incorporating the barrel of the invention;
FIG. 2 is an enlarged fragmentary section showing the construction of the barrel; and
FIG. 3 is a flow sheet showing the process of forming the cylinder barrel.

The drawings illustrate a fluid cylinder assembly which includes a cylindrical barrel 1 having its ends enclosed by heads 2 and 3. The ends of the barrel 1 bear against the shoulders of the respective heads 2 and 3 and the barrel is sealed with respect to the heads by seals 4. Heads 2 and 3 are connected together by a series of external tie rods 5.

Fluid is introduced and withdrawn from the interior of the cylinder assembly through ports 6 and 7 which are formed in heads 2 and 3, respectively. Ports 6 and 7 communicate with axial recesses 8 and 9 formed in the inner surface of the respective heads 2 and 3.

A piston 10 is slidably mounted within the barrel 1 and a pair of gaskets 11 are located within recesses in the piston and bear against the inner surface of the cylindrical barrel. The piston 10 is moved axially within the barrel 1 by a piston rod 12 which extends outwardly through head 2. The rod 12 is supported for sliding movement in a bearing 13 which is secured within a nose guide 14 connected to head 2. Seals 15 and 16 serve to prevent leakage of the fluid along the piston rod 11.

According to the invention, the cylindrical barrel 1 is formed of an outer layer 17 of fiber reinforced thermosetting resin and inner layer 18 of thermosetting resin containing finely divided particles of a lubricating material. The fiber reinforcement of layer 17 is preferably in the form of a strand or web of continuous unidirectional filaments and is helically wound in a number of superimposed layers. In some cases the web or strand may be in the form of braided tubing, matting, woven cloth, or the like.

The fibrous reinforcement of layer 17 can be mineral fibers such as glass or asbestos; synthetic fibers such as rayon, nylon, Dacron or Orlon; vegetable fibers such as cotton; animal fibers such as wool; or metallic reinforcement may be employed such as steel wire. The fibrous reinforcement generally comprises from 50 to 90% by weight of the layer 17.

The thermosetting resin used in layer 17 can be any conventional thermosetting resin used in reinforced plastic applications. The resin can be an epoxide or glycidyl polyether which may be prepared by condensing a polyhydric phenol with a polyepoxide or poly-functional halohydrin, as disclosed, for example, in Patent 2,801,227 entitled "Process for Manufacture of Glycidyl Ethers of Polyhydric Phenols." The glycidyl polyethers are generally prepared by heating the polyhydric phenol with the halohydrin at a temperature in the range of 50° C. to 150° C. and using 1 to 2 or more mols of the halohydrin per mol of the polyhydric phenol. An alkaline material, such as sodium or potassium hydroxide, is used in a stoichiometric excess of about 2 to 5% to the halohydrin. The heating is continued for several hours to effect the reaction and the product is then washed free of salt and base. The product is not a single simple compound but is generally a complex mixture of glycidyl polyethers and the principal product may be represented by the formula.

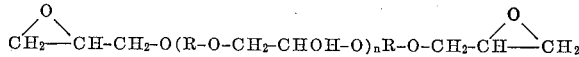

where $n$ is an integer of the series 0, 1, 2, 3 . . . and R represents the polyvalent hydrocarbon radical of the polyhydric phenol.

The glycidyl polyethers used in the invention have an epoxy equivalency of approximately 2. By the epoxy equivalency is meant the average number of epoxy groups contained in the average molecule of the glycidyl ether.

The curing agents used to cure the epoxy resin to its infusible, rigid state may take the form of 4,4' methylene dianiline, ethylene diamine, metaphenylene diamine, triethylene triamine, diamino diphenyl sulfone, acid anhydrides such as phthalic, dodencyl, succinic and chlorendic anhydrides and the like. Catalysts such as dicyandiamide and certain boron trifluoride complexes can also be used.

In addition, other thermosetting resins such as polyester, diallyphthalate, furane, melamine, and the like can also be used to impregnate the fibrous material in layer 17.

The inner layer 18 is formed of a thermosetting resin similar to that of outer layer 17. Preferably the resin is an epoxide or glycidyl polyether and small particles of a lubricating material, such as molybdenum disulfide, graphite, tungsten disulfide, tellurium disulfide, selenium disulfide, titanium disulfide, and mixtures thereof are uniformly distributed throughout the layer 18. The lubricating material generally has a particle size of less than 150 microns. The inner layer generally has a thickness of .002 to .020 inch with about .010 inch being preferred.

The inner layer 18 has the following general composition by weight:

Particles of lubricating material, 2 to 50%.
Cured thermosetting resin system, 98 to 50%.

In some cases it is desirable to employ a thixotropic material in the resin gel coat composition in order to increase the viscosity of the composition as it is applied to the mandrel. Any conventional thixotropic material can be used, such as silica gel, bentonite, kaolin, and the like. When using the thixotropic material the inner layer has the following composition by weight:

Particles of lubricating material, 2 to 35%.
Thixotropic material, .2 to 20%.
Cured thermosetting resin system, balance.

The preferred range of composition in weight percent is:
Particles of lubricating material, 5 to 15%.
Thixotropic material, 5 to 15%.
Cured thermosetting resin system, balance.

The cured thermosetting resin system includes the resin components and the curing agents or catalysts.

As the particles of the lubricating material are uniformly distributed throughout the thickness of the liner 18, self-lubricating properties are provided which will extend throughout the life of service of the cylinder barrel 1.

To carry out the process of fabricating the article, as shown in the flow sheet in FIG. 3, the mandrel is initially cleaned. When the process is used to produce a cylinder barrel which requires an extremely smooth and uniform internal surface, the mandrel must be completely free of corrosion and mechanical damage.

In general, the mandrel is wiped clean with a grease cutting solvent such as methylene chloride and then examined for clinging residue or other defects. The mandrel is then heated to an elevated temperature, in the neighborhood of 180° F. to evaporate any remaining solvent from the mandrel surface.

A convention mold release composition is then applied to the outer surface of the mandrel. The mold release composition can be any of the conventional materials commonly used to prevent the resin from sticking to the metal mandrel. Dow-Corning DC 20 silicone release agent, having the formula:

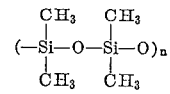

has proven particularly satisfactory in this process. Other mold release agents, such as a dispersion of Teflon (polytetrafluoroethylene) in a liquid hydrocarbon can also be used. After the mold release has been applied to the mandrel, the mandrel is heated to a temperature in the range of about 500° F. for a minimum of one hour to polymerize the mold release coating. After the mandrel is cooled, it should be wiped with a solvent such as toluene to remove any excess or unpolymerized mold release composition.

A layer of finely divided micro-pulverized powder is then applied over the mold release composition as a continuous layer. The powder can be any non-abrasive, non-corrosive finely divided material, preferably molybdenum disulfide or other powdered lubricating materials previously mentioned. Other powdered materials such as talc, bentonite, kaolin, silica gel, mica, metal stearates such as aluminum or zinc stearate, or the like can be used.

The powder can be applied to the mandrel by any desired manner, either by a suitable dusting mechanism or manually, in which the powder is dusted onto the mandrel with a puff or cloth. The dusting can be done either on a hot or cold mandrel. The powder serves as a wetting agent and has an affinity for both the mold release composition as well as the thermosetting resin gel coat which is subsequently applied. The powder insures that the resin gel coat will uniformly flow and wet all areas of the mandrel to thereby insure a uniform, smooth inner surface for the article.

A gel coat of a thermosetting resin containing dispersed particles of the lubricating material is then applied over the powder to form the inner layer 18 of the article. As previously mentioned, the gel coat consists of a thermosetting resin, such as an epoxide resin, containing dispersed particles of molybdenum disulfide or graphite as well as a curing agent. In addition, a conventional inert thixotropic material may also be added to the resin to provide a more viscous composition which will prevent the gel coat from flowing or dripping from the mandrel and insure a uniform coating.

The thickened gel coat is applied to the outer surface of the mandrel over the powdered molybdenum disulfide in any desired manner. A common method of applying the gel coat is to pass the mandrel through a bushing formed with a conical inner surface having a taper of perhaps 2°. The thickened gel coat is introduced through a valve into the interior of the bushing at a rate commensurate with the relative speed of travel between the bushing and the mandrel and a thin uniform coating of the resin is applied to the outer surface of the mandrel by a doctoring or wiping action. Alternately, any other desired method of applying the resin gel coating, such as spraying or dipping, can be used.

After the gel coat has been applied to the mandrel, the resin is partially polymerized to a solid load-bearing state by applying heat to the resin. The heat may be applied by passing the mandrel through an oven, by electrical resistance heating of the mandrel, or of any other desired method. The resin is generally heated to a temperature in the range of 300 to 450° F. and is maintained at this temperature for a period of time to partially polymerize the resin to an average molecular weight of over 500 and subsequently air cooled. In this partially polymerized state, the resin is solid and has some degree of flexibility. However, the resin has load-bearing properties so that the fiber layer 17, which is subsequently wrapped around the layer 18, will not cut through the resin of the layer 18.

After the gel coat or inner layer 18 has been partially polymerized, the fibrous material impregnated with a thermosetting resin is wound or wrapped around the inner layer 18 to form the outer layer 17. It is contemplated that the fibrous material may be applied to the inner layer 18 immediately after the partial polymerization of the resin gel coat, or alternatively, the mandrel can be stored for extended periods at room temperature or at refrigerated temperatures, depending on the particular curing agent used, before the outer layer is wound on the inner layer. Epoxide resin systems using curing agents, such as certain boron trifluoride complexes and dicyandiamide will not cure in reasonable lengths of time at temperatures below 300° F. so that the partial polymerization can be stopped at any desired state by cooling the mandrel below this temperature. With other curing agents, it may be necessary to refrigerate the mandrel to prevent further polymerization if the outer fibrous layer 17 is not to be immediately applied to the inner layer.

The fibrous material impregnated with the liquid thermosetting resin is wrapped over the inner layer 18 in a number of superimposed layers. The resin coating on the fibrous material can either be a liquid or a partially polymerized solid the helix angle employed in the winding depends on the particular article being formed and the desired physical properties. Generally, the helix angle will be in the range of about 30°.

After the desired number of layers of fibrous material have been wrapped over the partially polymerized inner layer 18 to provide the necessary physical properties, the entire structure is heated to a temperature generally in the range of 300° to 450° F. for a period generally of ½ to 2 hours to completely cure the resin of both the inner and outer layers and provide an integral structure in which the layers are bonded together as a unit. After the final cure, the article is stripped from the mandrel and the powdered molybdenum disulfide or graphite which was initially applied to the mandrel will be visible on the inner surface of the article. However, this powdered material will wear away rather quickly and the lubricating properties for the article are provided by the particles of graphite or molybdenum disulfide which are embedded and distributed within the inner resin layer 18.

The article, such as a cylinder barrel, made in accordance with the invention, has a substantially lesser weight than a cylinder barrel of comparable size formed of metal, such as steel or brass. Moreover, the article is corrosion-resistant, non-sparking and non-magnetic, which makes the article particularly adaptable for use with corrosive materials or hazardous gases or fluids. In addition, no liquid lubricant is needed which could adulterate foods or fabrics.

The use of the powdered material on the mandrel over the mold release composition, serves to produce a uniform, smooth internal surface for the cylinder barrel and generally no machining of the bore, as is necessary in the case of metal cylinder barrels, is required after the barrel is stripped from the mandrel.

A specific example of the invention is as follows:

A cylindrical steel mandrel having an outside diameter of 2.00 inches was initially cleaned by wiping the outer surface with methylene chloride. The mandrel was then heated to 180° F. for 1 minute to evaporate any methylene chloride remaining on the mandrel surface.

A liquid mold release composition, Dow-Corning DC 20, was applied to the outer surface of the mandrel. The mandrel was then heated at a temperature of 500° F. for a period of 1 hour to polymerize the coating.

Micropulverized molybdenum disulfide powder was then dusted manually over the dried mold release composition to provide a uniform coating of powder over the entire surface of the mandrel.

A thick gel coat was prepared by mixing 37 parts of epoxide resin DER 330 (Dow Chemical Co.), 38 parts epoxide resin DER 337 (Dow Chemical Co.), 4 parts of dicyandiamide, 11 parts of bentonite, and 10 parts of molybdenum disulfide powder.

After the materials of the resin gel coat were mixed together by milling, the gel coat was applied to the mandrel by injecting the gel coat within the inner conical surface of a bushing. The bushing was moved along the mandrel to provide a uniform gel coat having a thickness of 0.010 inch on the mandrel.

After the gel coat was applied, the mandrel was heated by electrical resistance heating to a temperature of 440° F. and then air cooled to 180° F. to partially polymerize the gel coat to a solid, load-bearing state.

The mandrel was then cooled and subsequently, a fibrous web of unidirectional glass fibers impregnated with a liquid epoxide resin was wrapped over the partially polymerized resin gel coat in a series of superimposed layers at a helix angle of 30°. The epoxide resin formulation was composed of 100 parts epoxide resin DER 331 (Dow Chemical Co.), and 14 parts meta phenylene diamine.

After 12 layers were applied over the gel coat, the mandrel was introduced into an oven at a temperature of 350° F. and maintained in the oven for a period of 1.5 hours to completely cure the resin of both the inner and outer layers.

Following the curing, the mandrel was removed from the oven and stripped from the mandrel. The resulting tubular member having a length of approximately 20 feet, was then cut into sections having a length of 8 inches to be used as cylinder barrels for air cylinder assemblies.

While the above description was directed to the fabrication of a cylinder barrel for gas or a fluid cylinder assembly, it is contemplated that the article prepared in accordance with the invention can be used for other wear resistant applications such as bearing inserts, bushing guides, piston-type fluid separators, and the like.

Various modes of carrying out the invention are contemplated as being within the scope of the following claims particularly pointing out and distinctly claiming the subject matter which is regarded as the invention.

I claim:

1. A tubular article having wear resistant properties, comprising an outer cylindrical laminated member formed of circumferentially disposed substantially continuous filaments of a reinforcing material bonded together with a cured thermosetting resin, and an inner member bonded to the inner surface of said outer laminated member and formed of a thermosetting resin containing finely divided particles of a lubricating material selected from the group consisting of molybdenum disulfide, graphite, tungsten disulfide, tellurium disulfide, selenium disulfide, tetanium disulfide, and mixtures thereof, said lubricating material comprising from 2 to 50% by weight of the inner member.

2. The structure of claim 1 in which the inner member has a thickness in the range of .002 to .020 inch.

3. In a fluid cylinder assembly, having a cylinder barrel, a head enclosing each end of the cylinder barrel, and a piston member slidably disposed within said cylinder barrel, said cylinder barrel comprising an outer member formed of a series of superimposed layers of substantially continuous fibers disposed in a helical pattern and bonded together with a cured thermosetting resin, and a liner bonded to the inner surface of said outer member and formed of a cured thermosetting resin containing uniformly distributed particles of a lubricating material selected from the group consisting of molybdenum disulfide, graphite, tungsten disulfide, tellurium disulfide, selenium disulfide, tetanium disulfide, and mixtures thereof, said particles of lubricating material providing self-lubrication for sliding friction between the piston member and the liner of said cylinder barrel.

4. A tubular article having wear resistant properties, comprising an outer cylindrical laminated member formed of substantially continuous filaments of a reinforcing material bonded together with a cured thermosetting resin, and an inner member bonded to the inner surface of said outer laminated member, said inner member consisting essentially of 2 to 35% by weight of finely divided particles of a lubricating material selected from the group consisting of molybdenum disulfide, graphite, tungsten disulfide, tellurium disulfide, selenium disulfide, tetanium disulfide, and mixtures thereof, 0.2 to 20% by weight of a finely divided thixotropic material and balance being a cured thermosetting resin system, said particles of lubricating material being uniformly distributed in said inner member and providing self-lubricating properties for the article.

5. A tubular article having wear resistant properties, comprising an outer cylindrical laminated member formed of substantially continuous filaments of a reinforcing material bonded together with a cured thermosetting resin, and an inner member bonded to the inner surface of said outer laminated member, said inner member consisting essentially of 2 to 35% by weight of finely divided particles of molybdenum disulfide, 0.2 to 20% by weight of a finely divided thixotropic material and balance being a cured epoxy resin, said particles of molybdenum disulfide being uniformly distributed in said inner member and providing self-lubricating properties for the article.

6. In an assembly subjected to substantial wear in service and having a cylindrical barrel and a member movably disposed within the barrel, said cylindrical barrel comprising an outer member formed of a series of superimposed layers of substantially continuous fibers disposed in a helical pattern and bonded together with a cured thermosetting resin, and a liner bonded to the inner surface of said outer member and formed of a cured thermosetting resin containing uniformly distributed particles of a lubricating material selected from the group consisting of molybdenum disulfide, graphite, tungsten disulfide, tellurium disulfide, selenium disulfide, tetanium disulfide, and mixtures thereof, said particles of lubricating material providing self-lubrication for moving frictional contact between the movable member and the liner of said cylindrical barrel.

References Cited by the Examiner
UNITED STATES PATENTS

| | | | |
|---|---|---|---|
| 2,652,943 | 9/1953 | Williams | 138—150 X |
| 2,686,155 | 8/1954 | Willis | 184—1 |
| 2,757,109 | 7/1956 | Martello | 308—238 |
| 2,893,793 | 7/1959 | Ryshavy | 308—240 |
| 2,945,638 | 7/1960 | Crawford et al. | 138—141 X |
| 2,971,922 | 2/1961 | Clem | 106—38.2 |
| 2,977,269 | 3/1961 | Nerwick. | |
| 3,040,712 | 6/1962 | Harrah | 92—170 |

OTHER REFERENCES

Glass-Reinforced Plastic Pipe publication by Norman M. Lloyd, Mechanical Engineering, April 1961, pages 45–48.

Molybdenum publication, Automative Industries, April 1962, pages 40–45.

SAMUEL ROTHBERG, *Primary Examiner.*

LAVERNE D. GEIGER, *Examiner.*

H. ARTIS, *Assistant Examiner.*

UNITED STATES PATENT OFFICE
CERTIFICATE OF CORRECTION

Patent No. 3,286,737                         November 22, 1966

Mark E. Kelly, Jr.

It is hereby certified that error appears in the above numbered patent requiring correction and that the said Letters Patent should read as corrected below.

Column 3, line 14, for "-CHOH-O" read -- -CHOH-$CH_2$-O --; column 5, line 14, for "alternatively" read -- alternately --.

Signed and sealed this 7th day of November 1967.

(SEAL)
Attest:

Edward M. Fletcher, Jr.                         EDWARD J. BRENNER
Attesting Officer                               Commissioner of Patents